United States Patent
Mercier

[11] 3,736,858
[45] June 5, 1973

[54] AIR VENTS

[75] Inventor: Jacques Mercier, Billancourt, France

[73] Assignees: Regie Nationale des Usines Renault, Billancourt (Haute de Seine); Automobiles Peugeot, Paris, France

[22] Filed: Mar. 19, 1971

[21] Appl. No.: 125,952

[30] Foreign Application Priority Data
Mar. 24, 1970 France..............................7010581

[52] U.S. Cl.....................................98/406, 98/108
[51] Int. Cl. .............................................F24f 13/06
[58] Field of Search ..................98/40 C, 40 A, 40 N, 98/108, 40 V

[56] References Cited
UNITED STATES PATENTS

| | | | |
|---|---|---|---|
| 3,378,199 | 4/1968 | Snell | 98/40 C |
| 3,391,629 | 7/1968 | Snell | 98/103 |

FOREIGN PATENTS OR APPLICATIONS

| | | |
|---|---|---|
| 580,093 | Great Britain | 98/40 A |

Primary Examiner—William E. Wayner
Attorney—Stevens, Davis, Miller & Mosher

[57] ABSTRACT

This air vent intended for private or office rooms, or for the passenger compartments of vehicles, notably automobiles, comprises an air outlet and a diffuser movable fitted therein to permit a variable and orientable diffusion of the air stream flowing therefrom, said outlet comprising part-cylindrical lips receiving a drum-shaped diffuser comprising in turn two opposite cylindrical sectors rotatably fitted in said lips about their common axis, at least one of said sectors being adapted to act a shutter to close said outlet completely in one position, air circulation passage being formed between said sectors, said passages being wider at one end than at the opposite end, whereby a divergent diffusion or a convergent projection is obtained accordingly as the drum is disposed with the wider or narrower ends of its air circulation passages on the outlet side of the diffuser, the air stream thus obtained being adapted to be oriented at will also by rotating said drum.

7 Claims, 7 Drawing Figures

AIR VENTS

The present invention relates to ventilation nozzles or air vents adapted to be fitted in any and all heating, air-conditioning or ventilation system, whether for private or office rooms, or compartments of vehicles, notably automobiles.

Hitherto known air vents provide one or two of the following possibilities :
- directional adjustment of the incoming air flow,
- delivery of a convergent stream,
- delivery of a divergent stream.

It is the essential object of this invention to provide an improved air vent of the grille type capable of providing all these possibilities while being extremely simple and economical to manufacture on a commercial scale, since even the use of conventional pivoted blades is completely dispensed with.

Basically, the air vent according to this invention, which comprises an air inlet and a diffuser adjustably mounted therein to permit a variable and orientable diffusion of the air stream flowing therethrough, is characterized in that the outlet comprises a transverse opening having part-cylindrical lips adapted to receive a drum-shaped diffuser having turn two opposite cylindrical sectors rotatably mounted in said lips about their common axis, at least one of said cylindrical sectors being adapted to act as a shutter, a gap being provided between said sectors and partitioned to form a number of air passages having a smaller cross-sectional area at one end than at the other end, whereby a divergent diffusion or a convergent projection is obtained according as the drum is set with the wider ends or the narrower ends of said air passages on the output side of the diffuser, and that the adjustment of the air flow direction, as well as the closing of the air inlet, can be obtained by simply rotating said drum.

A typical embodiment of an air vent according to this invention will now be described by way of example with reference to the attached drawing, in which.

Figure 1:
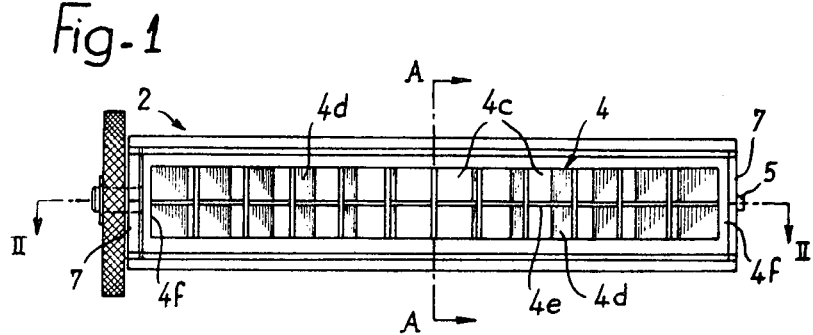
FIG. 1 is a front view of the air vent.

The air vent or ventilation nozzle according to this invention comprises an air circulation duct 1 comprising two relatively shallow sections assembled and formed at the outlet end with an opening comprising part-cylindrical upper and lower lips 3 adapted to mount and retain a drum-shaped diffuser 4 comprising two opposite cylindrical sectors 4a, 4b rotatably mounted in said lips about their common axis. Between these sectors a gap is left and partitioned to provide air circulation channels or passages 4c having a smaller cross-sectional area at one end than at the other end. These passages are bounded in this example by fixed blades or partitions 4d extending in a direction substantially transverse to the axis of rotation of the drum-shaped diffuser 4 ; at mid-height these blades 4d are interconnected by a diametral blade 4e extending throughout the drum length between the end flanges 4f thereof. In the case illustrated in FIG. 2 the blade disposal is such that the leading edges thereof are equally spaced from one another and the tangents at this point form an angle V decreasing gradually in the direction away from said central blade 4d, and in the same direction the mean radius of each blade also decreases gradually.

The lateral flanges 4f of drum 4 are provided with pivot pins or trunnions 5,6 journalled in the side walls 7 of outlet 2, one of these pivot pins, in this example the pin 6, has wedged or otherwise secured thereto, externally of the corresponding flange 7, a knurled knob or wheel 8 for actuating the drum 4, this knob or wheel 8 being retained on the pivot pin 7 by means of a circlip 9.

This knob or wheel 8 is engaged, on its lateral face adjacent the flange 7, by a detent-positioning ball 10 movable in a recess 11 formed in said outlet ; this ball 10 is urged by a coil compression spring 12 for engagement with a variable number of positioning notches 13 disposed on a common circle in the wheel 8, according to the predetermined number of adjustment positions contemplated.

Figure 4:
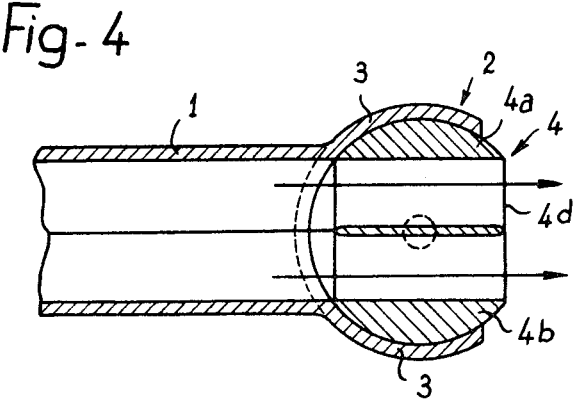
FIGS. 4, 5 and 6 are sections taken along the line A—A of FIG. 1, to illustrate various possible positions of the air vent.
Figure 6:
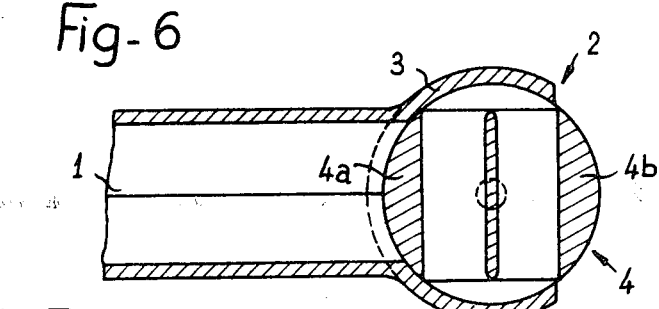
Figure 7:
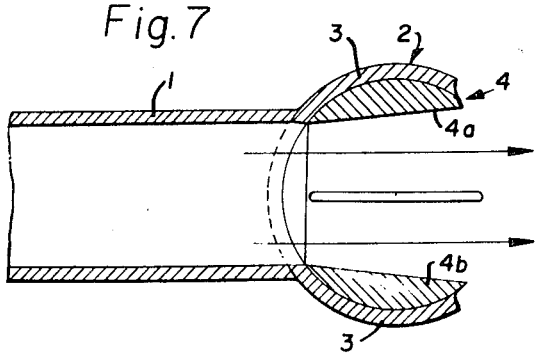
FIG. 7 shows the air vent with a larger cross section at one end.

At least one of the cylindrical sectors 4a, 4b (both, in the example illustrated in the drawings) has such dimensions that it can act as a shutter for closing the air outlet, as clearly apparent from the position illustrated in FIG. 6. As illustrated in FIG. 4, the part-cylindrical sectors 4a, 4b are preferably so shaped that their registering faces are co-planar with the inner major surfaces of duct 1, so as to avoid any modification, notably any narrowing, of the cross-sectional passage area available for the air flow through the diffuser in the fully open position thereof.

Figure 5:
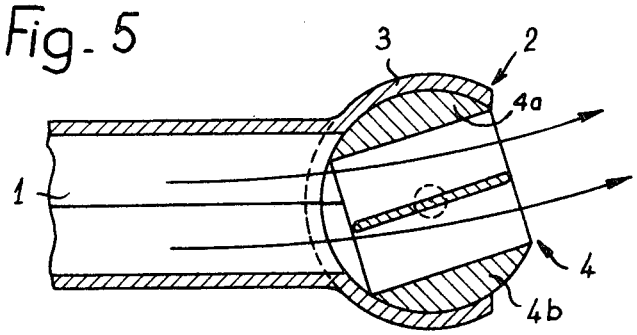

FIG. 5 shows clearly that the air stream can be set at will in any desired direction by rotating the intermediate drum 4 to any position between the extreme positions shown in FIGS. 4 and 6.

Figure 2:
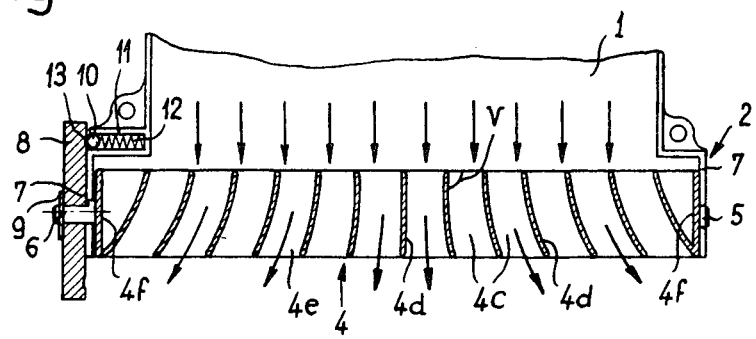
FIG. 2 is a section taken along the line II—II of FIG. 1.
Figure 3:
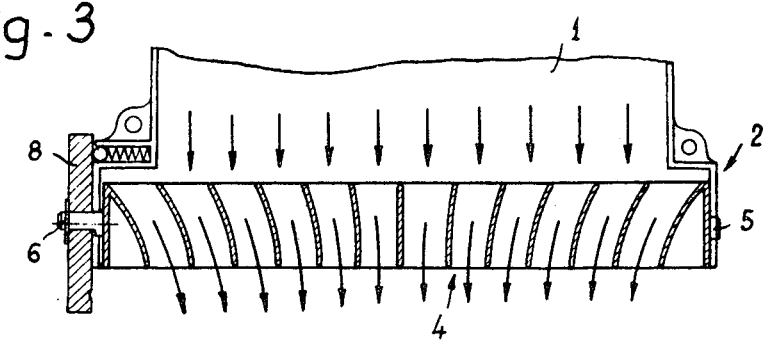
FIG. 3 is a view similar to FIG. 2 but after rotating the diffuser through 180°.

The arrows of FIGS. 2 and 3 illustrate the case of a divergent flow or diffusion of the air stream, and the case of a convergent projection, respectively, as obtained by setting the drum 4 in two positions spaced 180° apart.

From a practical standpoint, the diffusing drum may be moulded as an integral part, and the assembly thereof with the duct outlet is also extremely simple and easy.

What is claimed as new is :

1. An air vent for producing a variable and orientatable diffusion of an air stream comprising:
    a. a transverse opening having semi-cylindrical lips;
    b. a drum shaped diffuser having two opposed cylindrical sectors with at least one of the sectors dimensioned to act as a shutter; the diffuser being rotatably mounted within the semi-cylindrical lips;
    c. a gap between the sectors with partitions to form a plurality of air circulation passages having a smaller cross-sectional area at one end than the other;
    c. means to rotate the drum about its axis to obtain a divergent diffusion, a convergent projection or a blockage of the flow through the vent.

2. Air vent according to claim 1 in which the aforesaid air circulation passages are bounded by fixed blades having a smaller mutual spacing at one end than at the other end.

3. Air vent according to claim 1 in which the aforesaid partitions are interconnected at mid-height by a blade extending diametrally throughout the drum length.

4. An air vent according to claim 1, in which the registering faces of said cylindrical sectors are spaced from each other so as to be coplanar with the inner walls of the air inlet in the fully open position of the drum.

5. An air vent according to claim 1 in which the means to rotate the drum is a wheel having detent-positioning means provided for resiliently retaining said wheel and therefore said drum in a desired angular position in relation to the air outlet.

6. An air vent for producing a variable and orientatable diffusion of an air stream comprising:
   a. a transverse opening having semi-cylindrical lips;
   b. a drum shaped diffuser having two opposed cylindrical sectors with at least one of the sectors dimensioned to act as a shutter; the diffuser being rotatably mounted within the semi-cylindrical lips;
   c. a gap between the sectors with partitions to form a plurality of air circulation passages, a central partition substantially perpendicular to the drum axis with the inclination of the other partitions increasing in the direction away from the central blade;
   d. means to rotate the drum about its axis to obtain a divergent diffusion, a convergent projection or a blockage of the air flow through the vent.

7. The vent of claim 6 in which the radius of curvature of the other partitions also decreases in the direction away from the central partition.

* * * * *